H. F. BEAUDRY.
SPECTACLES OR EYEGLASSES.
APPLICATION FILED JUNE 29, 1915.
1,181,365. Patented May 2, 1916.
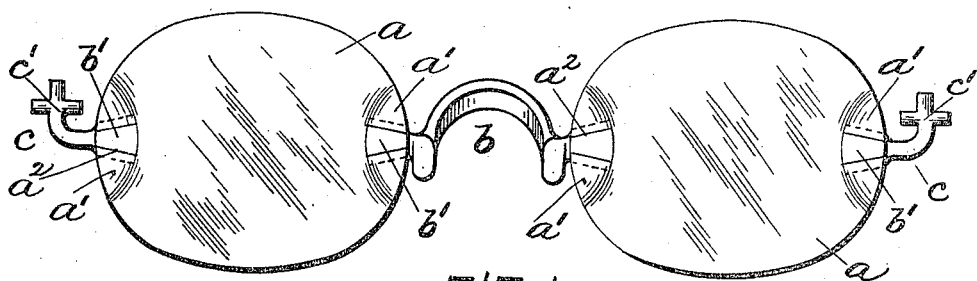
FIG. 1.
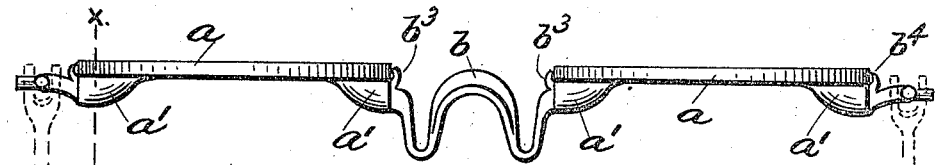
FIG. 2.
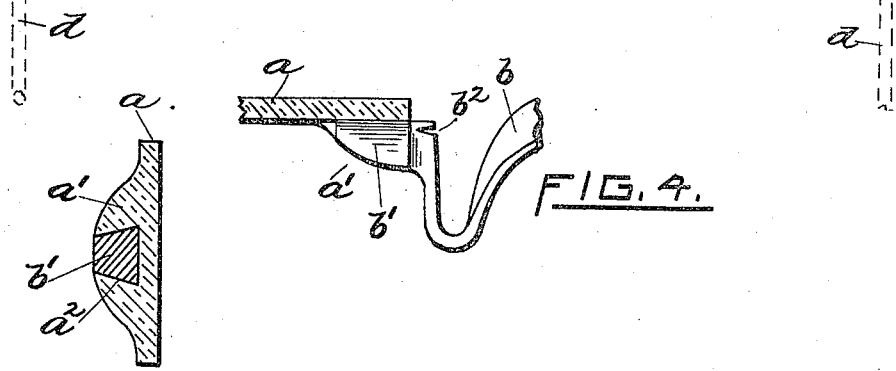
FIG. 3.
FIG. 4.
WITNESSES:
Frank Allen
G. W. McLean
INVENTOR:
Henry F. Beaudry.
By C. J. Hannigan,
Attorney.

UNITED STATES PATENT OFFICE.

HENRY F. BEAUDRY, OF PROVIDENCE, RHODE ISLAND.

SPECTACLES OR EYEGLASSES.

1,181,365.   Specification of Letters Patent.   Patented May 2, 1916.

Application filed June 29, 1915. Serial No. 36,973.

*To all whom it may concern:*

Be it known that I, HENRY F. BEAUDRY, a citizen of the United States, residing at the city of Providence, in the county of Providence and State of Rhode Island, have invented certain new and useful Improvements in Spectacles or Eyeglasses, of which the following is a specification.

The object of my invention is to provide for the fastening to the lenses of spectacles and eyeglasses, of the parts necessary to constitute fittings of special construction.

Further objects in view are to provide the lenses with wedge-holding points for the fittings, thereby to avoid perforating the lenses and eliminating the use of screws, and to afford a neat appearance to articles of this character.

In the accompanying sheet of drawings, wherein like reference characters indicate like parts, Figure 1 is a rear face view of a pair of spectacles, showing the parts as constructed in accordance with my invention; Fig. 2 is a top view of the same; Fig. 3 is an enlarged cross section taken on line $x$.—$x$. of Fig. 2; Fig. 4 is a detail portion of the nose-piece, showing the means for securing the same to the lens.

In carrying out my invention I construct the lenses —$a$— so as to leave opposed raised portions upon their rear faces, as at —$a^1$, $a^1$—, and each portion provided with a tapered entering recess —$a^2$—.

The lenses are united together by a single fitting to form a nose-piece —$b$—, which has projecting wedge-shaped ends —$b^1$, $b^1$—, of a size to fit snugly within the recesses —$a^2$— of the lenses; an outward pull upon the latter being against resistance of the opposed tapered sides of the wedge ends —$b^1$—.

To prevent looseness of the fitting —$b$— the stock of the same is slitted at a point forward of its wedge ends —$b^1$—, as at —$b^2$— in Fig. 4, so as to leave a lug —$b^3$— to be bent over upon the edge of either lens —$a$—, and thereby securing the latter firmly to the fitting, in the manner shown in Fig. 2.

The fittings for the outer recessed portions of the lenses are each constructed alike, to form a member —$c$— which has a wedge-shaped end —$b^1$— to enter the recess—$a^2$— of the lens and be secured thereto by a lug —$b^4$— (see Fig. 2), formed by slitting the stock of the fitting, in the same manner as stated for securing the nose-piece —$b$—.

Each fitting —$c$— has an upturned cross portion —$c^1$— for bearing a temple connection —$d$—.

Having the lenses providing wedge-shaped entering recesses —$a^2$— afford long bearing points for the fittings, so that the lenses are prevented from wabbling loose and changing their positions of focal points.

By my construction of lenses and mode of attaching the fittings thereto I provide a structure having few parts, so that an optician is enabled to save time and labor in assembling the parts to form a spectacle or eyeglass.

What I claim and desire to secure by Letters Patent is—

1. In spectacles or eyeglasses, lenses having opposed raised portions formed upon their rear faces, each portion provided with a tapered entering recess; a nose-piece having wedge ends to fit within the recesses of the lenses, and said nose-piece having slits formed therein to enable its stock to be bent over the edge of the lenses in securing the same in place.

2. In spectacles or eyeglasses, lenses having opposed raised portions, each portion provided with a tapered entering recess; a member having a wedge end to fit within one of the recesses of the lenses and bearing a temple connection.

In testimony whereof I affix my signature in presence of two witnesses.

HENRY F. BEAUDRY.

Witnesses:
C. T. HANNIGAN,
FRANK ALLEN.

Copies of this patent may be obtained for five cents each, by addressing the "Commissioner of Patents, Washington, D. C."